C. W. TRIGG.
PROCESS FOR RECOVERY OF ESCAPING AROMAS OF FOOD, &c.
APPLICATION FILED NOV. 19, 1917.
1,367,725.
Patented Feb. 8, 1921.
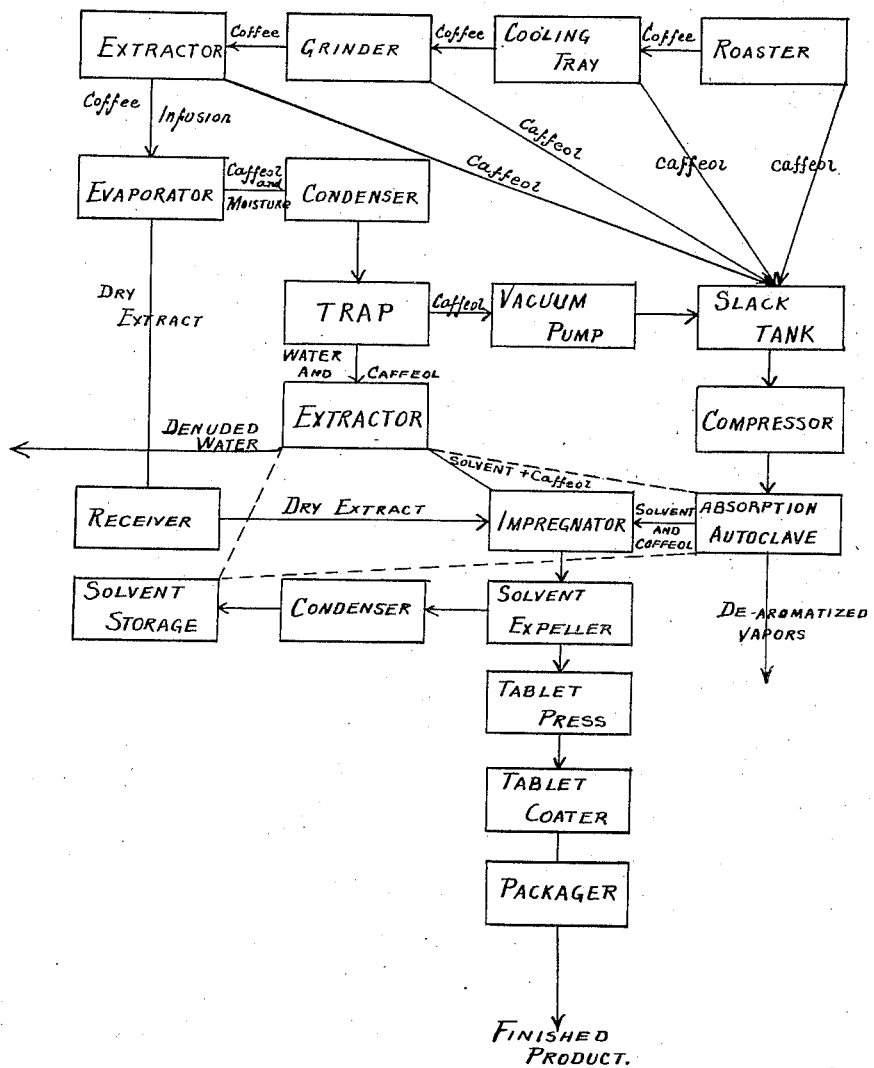

UNITED STATES PATENT OFFICE.

CHARLES W. TRIGG, OF PITTSBURGH, PENNSYLVANIA, ASSIGNOR TO JOHN E. KING, OF DETROIT, MICHIGAN.

PROCESS FOR RECOVERY OF ESCAPING AROMAS OF FOOD, &c.

1,367,725.     Specification of Letters Patent.    Patented Feb. 8, 1921.

Application filed November 19, 1917. Serial No. 202,764.

*To all whom it may concern:*

Be it known that I, CHARLES W. TRIGG, a citizen of the United States, residing at Pittsburgh, in the county of Allegheny, State of Pennsylvania, have invented a new and useful Improvement in Processes for Recovery of Escaping Aromas of Food, &c., of which the following is a specification.

This process relates to the recovery of the volatile, aromatic and flavoring substances escaping during the preparation of solutions and extracts of food or of dried, dehydrated, desiccated, or canned comestible or potable organic substances.

It is the purpose of this process more especially to catch the fleeing caffeol of coffee, which escapes during many operations on the coffee-berry, as for instance, during roasting, cooling of the roasted berries on the trays, grinding, extracting coffee solution to obtain a water-soluble coffee extract, and even during the preparation of the coffee infusion or decoction. Caffeol also escapes during the recovery of caffein from solvents used primarily for catching the caffein. To all these operations and any other in which caffeol escapes, it is the purpose of this discovery to apply this process of recovery.

Caffeol is a complex compound whose chemical constitutents no one has ever determined with technical accuracy, but the term has often been given a formula which for some purposes may be accurate enough. I use it in this specification and claims in the sense of the aroma and flavoring substances that give the coffee beverage its pleasing odor and flavor. These aromas are very often spoken of as the essential oils of coffee.

The prior art shows many attempts to prepare coffee extracts, by steam distillation, destructive distillation, mere evaporization, repeated infusions with cold water to extract the aromas before extracting the other substances and evaporating to dryness, absorption of the aromas in an absorbing medium and adding the absorbing medium and the absorbed substance to the coffee extract where both remain, subjecting the ground coffee-berries to the action of certain solvents and many other processes. So far as I am informed none of these processes has met with any, or at least any considerable, commercial success.

Caffeol is a very volitant and fugitive constituent and in many of the processes very little, if any of it, is recovered. In other of the processes, the processes are such as to cause chemical reactions that make it impossible for the final coffee extract to duplicate the original beverage when in water solution.

It is the object of this discovery to effect the recovery of this fugacious caffeol in large quantities wherever it escapes and to make this recovery and add it to the dry extract under such conditions as to neither change the chemical nature of the constituents of the dry extract nor the caffeol, thus making possible the substantial attainment of coffee beverage from water-soluble coffee extract with identical properties to coffee beverage made from fresh ground roasted coffee.

To better illustrate and visually summarize my process, I have attached a sheet of drawing or "flow sheet,"

In extracting the coffee infusion by evaporation by spraying in a vacuum some of the caffeol is carried down with the condensation of the vapors in what I call and illustrate in the flow sheet as a "trap." The recovery of the caffeol by this distillation, and a suitable solvent, I have made the subject of a separate application and hence I will not here further detail the process.

But it will be noted that the trap is connected up with a vacuum pump in the drawings and that some of the caffeol is shown passing into the pump. This is inevitable and ordinarily this caffeol would be lost. Upon passing through the pump the caffeol together with the exhausting air passes into a slack tank, from thence through an air compresser into an autoclave. The slack tank should be capable of withstanding a high vacuum or several hundred pounds pressure and its purpose is to prevent too high a pressure accumulating between the vacuum pump and the compressor in case the compressor at times does not take the aromatized air as fast as the suction pump delivers it; or to prevent injury to the vacuum pump in case the compression pump is exhibiting a greater temporary capacity than the vacuum pump.

It is also to be noted that the aromas or caffeol escaping from the roasting coffee, from the coffee cooling on the trays, from the grinder, and from the extractor or infusion can be directed into the slack tank or directly to the compressor. There also might be added the caffeol escaping during the evaporization of a solvent to leave caffein, and there are perhaps several other operations in connection with coffee where my process could be advantageously used.

From the compressor the aromatized air and vapors pass into the absorption autoclave in which is introduced a suitable viscous, aqueous, or volatile solvent, such as water, pentane, ethyl ether, butane, ethyl chlorid, methyl chlorid, etc. The aromatized air and vapor under pressure is bubbled through the solvent or passed through a spray of the solvent. The interior pressure in the autoclave can be maintained constant at a pressure preferably between 200-250 pounds to the square inch by means of a safety valve of the Fisher type or a spring safety valve, for instance. This safety valve is calculated to let the de-aromatized gases escape at the same rate that the aroma-bearing gases are pumped in and will be a substantially continuous operation.

The caffeol when under heavy pressure is much more susceptible to the action of the solvent and especially so when the contents of the autoclave are refrigerated. This refrigeration can be secured by passing the escaping, de-aromatized vapors and air through a coil in the refrigerating brine or solution. The heat absorbed by the expanding gases cools the brine.

From the autoclave the solvent and caffeol can be led to a tank called the impregnator, wherein the dry soluble coffee extract from which the caffeol has escaped and the solvent bearing the caffeol may be united preferably under pressure. The solvent may be then driven off by allowing the pressure to return to normal, exerting a slight vacuum, permitting the temperature to return to atmospheric, or by applying a small amount of heat. The less rapid volatility of the caffeol as well as the affinity of the dry extract for the caffeol will avoid the escape of the caffoel during the evaporation of the solvent.

The evaporating solvent may be condensed as indicated in the drawing and returned for storage and re-use.

The impregnated extract may be pressed into tablets which preferably are coated with some water-soluble, physiologically inactive, neutral, non-deliquescent, material such as gelatin, albumen, casein, algin, etc., or combination thereof; or the dry finished product may be marketed in capsules of gelatin or other suitable material. The tablets may be prepared for the market in suitable air-tight packages. In pressing the impregnated extract into tablets and even in packing the tablets, it is advantageous to do the same in an atmosphere having a supernormal pressure to prevent the volatile caffeol escaping.

The left hand side of the flow sheet also depicts a process which is made the subject of a separate application. This process consists of extracting the ground coffee by making an ordinary coffee infusion or decoction, the evaporating *in vacuo*, condensing the caffeol contained in the vapor, and catching the condensate in a trap. The caffeol is recovered from the water by using a suitable solvent, such as butane, pentane, ethyl chlorid, methyl chlorid, etc., and then separating the aqueous layer from the solvent and caffeol. This solvent may then be placed in the absorption autoclave, where under pressure and refrigeration it will be capable of absorbing or dissolving more caffeol. This process of condensation, however, does not catch all the caffeol and hence it is here where my present process claimed in this application, may attach. The caffeol passing through the vacuum pump is then recovered by the agencies already described.

It is well to add that it is preferable not to use a vacuum pump of the liquid seal variety as this is liable to contaminate and absorb the gases passing through it.

What I claim is:

1. The process for the purpose specified, comprising the steps of pumping of a gas bearing coffee aroma into a closed chamber, the maintaining of the contents of said chamber at a super-atmospheric pressure, and the passing of the gas with such coffee aroma under such pressure into contact with a solvent of said coffee aroma.

2. The process for the purpose specified, comprising the steps of pumping of a gas bearing a coffee aroma into a closed receptacle, the maintaining of the receptacle in a chilled condition, the maintaining of a super-atmospheric pressure for the contents of the receptacle, and the passing of the gas bearing the coffee aroma into contact with a coffee aroma solvent.

3. The process for the purpose specified, comprising the steps of pumping of gas containing coffee aroma into a closed receptacle, the maintaining of a super-atmospheric pressure in said receptacle, the passing of the gas bearing the aroma under pressure into contact with a caffeol solvent and allowing the dearomatized gas to escape and the guiding of the expanding gas in proximity with the closed receptacle to chill the contents thereof.

4. The process for the purpose specified, comprising the steps of pumping of gas bearing coffee aroma into a closed receptacle, the maintaining of the contents of the receptacle under super-atmospheric pressure, the passing of the gas bearing the coffee aroma into contact with a coffee aroma solvent, and the passing of the solvent containing the coffee aroma into a chamber whose contents are under pressure and into contact with coffee-extract to impregnate the same with coffee aroma.

5. The process for the purpose specified, comprising the steps of pumping of gas containing coffee aroma into a closed receptacle, the maintaining of a super-atmospheric pressure for the contents of said receptacle, the passing of the gas bearing the coffee aroma into contact with the coffee aroma solvent, the passing of the solvent bearing the coffee aroma into a chamber whose contents are under pressure and which contains coffee-extract, the said solvent and caffeol being brought into contact with the coffee-extract which is allowed to absorb the solvent and caffeol, and then the allowing of the solvent to escape from impregnated extract by a reduction of the pressure about the extract.

6. The process for the purpose specified, comprising the steps of evaporation of a coffee infusion in a vacuum chamber, the condensing of the vapors arising during evaporation and the extraction of the caffeol therefrom, the exhausting of the vacuum chamber and compressing of the contents pumped therefrom in a closed chamber under relatively heavy pressure, and the passing of the gases bearing the coffee aroma into contact with the caffeol solvent in said closed chamber.

7. The process for the purpose specified, comprising the steps of evaporation of a coffee infusion in a vacuum chamber, the condensing of the vapors therefrom and extracting the same for caffeol, the exhausting of said chamber and leading the gases pumped therefrom into a slack tank, the compressing of the gases drawn from the slack tank into a closed chamber where the pressure is maintained at a relatively high degree, and the passing of the gases thus obtained bearing the aroma through a caffeol solvent.

In witness whereof, I have hereunto set my hand on the 10th day of November, 1917.

CHARLES W. TRIGG.